United States Patent
Dai et al.

(10) Patent No.: US 11,104,827 B2
(45) Date of Patent: Aug. 31, 2021

(54) GUMMED PAPER

(71) Applicant: NINGDE AMPEREX TECHNOLOGY LIMITED, Ningde (CN)

(72) Inventors: Zhifang Dai, Ningde (CN); Luran Zhang, Ningde (CN); Hai Long, Ningde (CN); Xinghua Tao, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 81 days.

(21) Appl. No.: 16/197,220

(22) Filed: Nov. 20, 2018

(65) Prior Publication Data
US 2019/0153266 A1 May 23, 2019

(30) Foreign Application Priority Data
Nov. 23, 2017 (CN) .......................... 201721583293.6

(51) Int. Cl.
*C09J 7/21* (2018.01)
*C09J 7/35* (2018.01)
*C09J 7/30* (2018.01)
C08K 9/10 (2006.01)
C08K 5/23 (2006.01)
C08K 5/24 (2006.01)

(52) U.S. Cl.
CPC . *C09J 7/21* (2018.01); *C09J 7/30* (2018.01); *C09J 7/35* (2018.01); *B32B 2405/00* (2013.01); *C08K 5/23* (2013.01); *C08K 5/24* (2013.01); *C08K 9/10* (2013.01); *C09J 2301/1242* (2020.08); *C09J 2301/408* (2020.08); *C09J 2301/412* (2020.08); *C09J 2400/283* (2013.01); *C09J 2433/00* (2013.01); *Y10T 428/24752* (2015.01); *Y10T 428/2848* (2015.01)

(58) Field of Classification Search
CPC ......... C09J 7/21; C09J 7/30; C09J 7/35; C09J 7/385; C09J 2205/102; C09J 2205/11; C09J 2400/283; C09J 2201/134; C09J 2433/00; C08K 5/23; C08K 5/24; C08K 9/10

See application file for complete search history.

(56) References Cited

U.S. PATENT DOCUMENTS

| | | | | |
|---|---|---|---|---|
| 5,597,634 | A * | 1/1997 | Bloomer | G09F 3/02 383/101 |
| 6,903,898 | B2 * | 6/2005 | Nonaka | B32B 5/20 360/99.19 |
| 6,948,743 | B1 * | 9/2005 | Peterson | G09F 3/0289 283/101 |
| 7,357,249 | B1 * | 4/2008 | Weber | G09F 3/02 206/308.1 |
| 7,473,453 | B2 * | 1/2009 | Fisher | B32B 7/12 428/40.1 |
| 7,718,257 | B2 * | 5/2010 | Murata | C09J 7/0207 428/317.1 |
| 7,910,206 | B2 * | 3/2011 | Kiuchi | C09J 7/29 428/354 |
| 2008/0054622 | A1 * | 3/2008 | Hodsdon | G09F 3/02 283/81 |
| 2012/0058335 | A1 * | 3/2012 | Kamitani | C09J 7/381 428/355 EN |

FOREIGN PATENT DOCUMENTS

CN          204939378 U  *  1/2016    ............ C09J 11/00

OTHER PUBLICATIONS

Dai Zhifang, "Structure Adhesive Tape", machine translation of CN 204939378U, Jan. 6, 2016 (Year: 2016).*

* cited by examiner

*Primary Examiner* — Anish P Desai
(74) *Attorney, Agent, or Firm* — Morgan, Lewis & Bockius LLP

(57) ABSTRACT

A gummed paper includes: a first adhesive layer, configured to adhere to an object; a first substrate, adhered to a surface of the first adhesive layer opposite to the object; a second adhesive layer, adhered to a surface of the first substrate opposite to the first adhesive layer; a second substrate, adhered to a surface of the second adhesive layer opposite to the first substrate; and a plurality of foaming agent particles, distributed in the first adhesive layer.

18 Claims, 4 Drawing Sheets

GUMMED PAPER

CROSS-REFERENCE TO RELATED APPLICATION

This application claims priority to and benefits of Chinese Application No. 201721583293.6, filed on Nov. 23, 2017, the entire content of which is incorporated herein by reference.

FIELD

The present disclosure relates to the field of gummed papers, and more particularly to a gummed paper (also referred to herein as "multilayer adhesive article").

BACKGROUND

In the coating process, a groove is often required at a certain position of a diaphragm. For this, a laser washing technology is often applied, however, the parameters of the laser washing process are difficult to control, and the yield is low.

SUMMARY

In embodiments of the present disclosure, there is provided a gummed paper, including: a first adhesive layer, configured to adhere to an object; a first substrate, the first adhesive layer disposed between the first substrate and the object; a second adhesive layer, adhered to a surface of the first substrate opposite to the first adhesive layer; a second substrate, the second adhesive layer disposed between the first substrate and the second substrate; and a plurality of foaming agent particles, distributed in the first adhesive layer.

In some embodiments of the present disclosure, the second substrate and the second adhesive layer extend outwards in a length direction of the gummed paper, such that at least one of two ends of the second substrate and at least one of two ends of the second adhesive layer extend beyond an end of the first substrate corresponding to the at least one of the two ends of the second substrate in the length direction to form an extension part of the second substrate and an extension part of the second adhesive layer, and the extension part of the second adhesive layer is capable of adhering to the object.

In some embodiments of the present disclosure, the second substrate and the second adhesive layer extend outwards in the length direction of the gummed paper such that the two ends of the second substrate and the two ends of the second adhesive layer extend beyond ends of the first substrate corresponding to the two ends of the second substrate in the length direction.

In some embodiments of the present disclosure, a length of the extension part of the second substrate and a length of the extension part of the second adhesive layer are both greater than a total thickness of the first substrate and the first adhesive layer.

In some embodiments of the present disclosure, in a width direction of the gummed paper, an edge of the second substrate and an edge of the second adhesive layer at a same side are within an edge of the first substrate corresponding to the edge of the second adhesive layer, such that a width of the second substrate and a width of the second adhesive layer are both less than a width of the first substrate.

In some embodiments of the present disclosure, in the width direction of the gummed paper, a difference between the width of the second substrate and the width of the first substrate is less than 15 mm.

In some embodiments of the present disclosure, a projection of a central line of the second substrate in a length direction of the gummed paper on a surface of the first substrate coincides with a central line of the first substrate.

In some embodiments of the present disclosure, a width of the first adhesive layer is equal to that of the first substrate, and a length of the first adhesive layer is equal to that of the first substrate; or a width of the second adhesive layer is equal to that of the second substrate, and a length of the second adhesive layer is equal to that of the second substrate; or the width of the first adhesive layer is equal to that of the first substrate, the length of the first adhesive layer is equal to that of the first substrate, and the width of the second adhesive layer is equal to that of the second substrate, the length of the second adhesive layer is equal to that of the second substrate.

In some embodiments of the present disclosure, the gummed paper further includes: a notch disposed in a width direction of the gummed paper, in which the notch cuts through the first substrate and cuts into the first adhesive layer in a thickness direction, and a depth of the notch is less than or equal to a total thickness of the first substrate and the first adhesive layer.

In some embodiments of the present disclosure, the notch disposed in the width direction of the gummed paper cuts through the second substrate and cuts into the second adhesive layer, the first substrate and the first adhesive layer in the thickness direction of the gummed paper, and the depth of the notch is less than or equal to a total thickness of the second substrate, the second adhesive layer, the first substrate and the first adhesive layer.

BRIEF DESCRIPTION OF THE DRAWINGS

The accompanying drawings, which are incorporated in and constitute a part of this specification, illustrate embodiments, features, and aspects of the present disclosure and, together with the description, serve to explain the principles of the present disclosure.

REFERENCE NUMERALS

Figure 1:
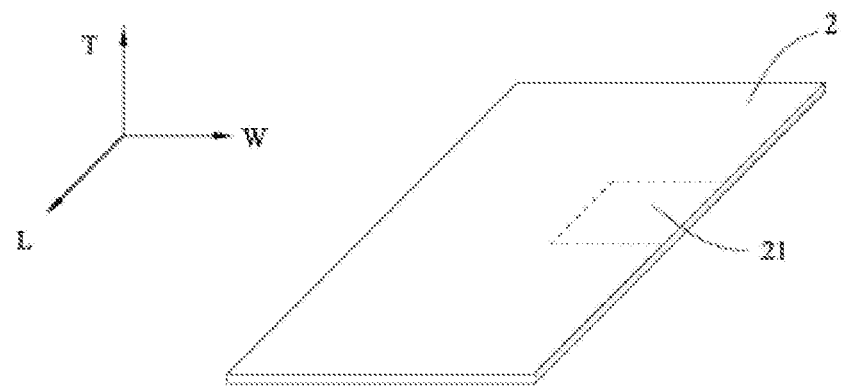
FIG. 1 illustrates a perspective view of an object to which a gummed paper is applied according to an embodiment of the present disclosure.
Figure 2:
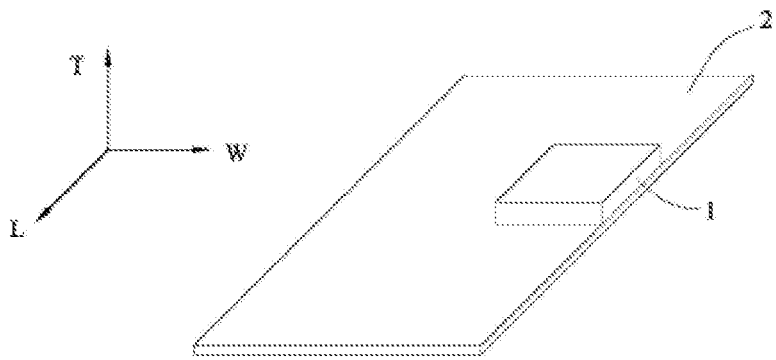
FIG. 2 illustrates a perspective view of the gummed paper adhered to an object according to an embodiment of the present disclosure.
Figure 3:
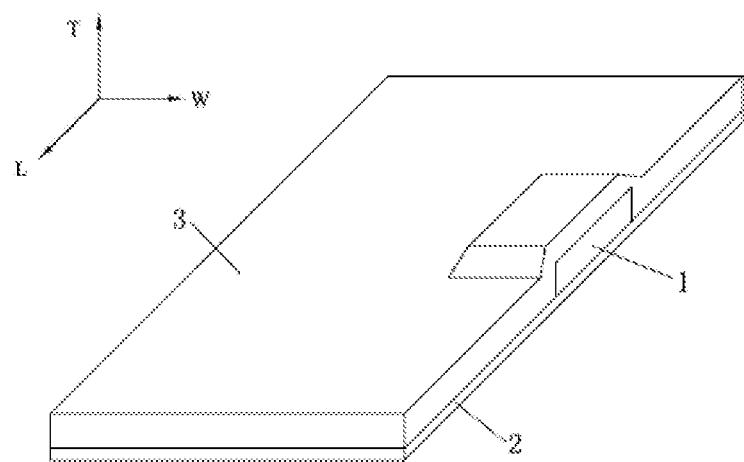
FIG. 3 illustrates a perspective view of the gummed paper coated with a material layer thereon according to an embodiment of the present disclosure.
Figure 4:
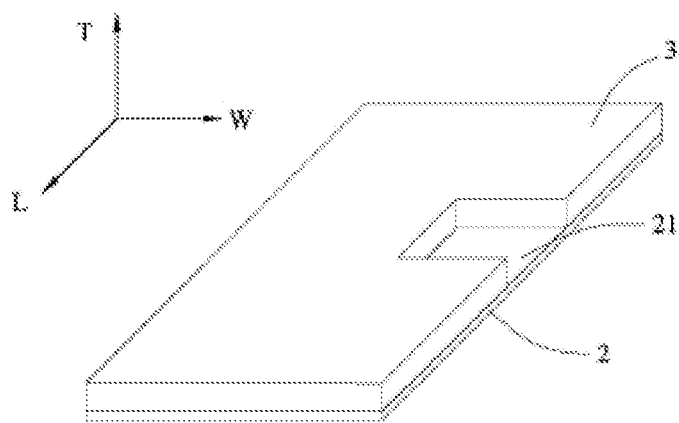
FIG. 4 illustrates a perspective view of the object after the gummed paper is peeled off according to an embodiment of the present disclosure.

1: gummed paper; 11: first adhesive layer; 12: first substrate;
13: second adhesive layer; 14: second substrate; 15: notch;
2: object; 21: reserved region; 3: material layer;
L: length direction; W: width direction; T: thickness direction;
A-A: central line of the second substrate in a length direction.

DETAILED DESCRIPTION

Explanatory embodiments, features, and aspects of the present disclosure will be described in detail below with reference to the drawings. The same or similar elements and the elements having same or similar functions are denoted by like reference numerals throughout the descriptions and drawings. Though various aspects of the embodiments are shown in the drawings, it is not necessarily to the draw drawings to scale, unless specified otherwise.

The word "exemplary" used herein means that embodiments related thereto are served as examples and are illustrative. Any "exemplary" embodiment described herein is not necessary to be construed to be superior to or better than other examples.

In addition, in order to better explain the present disclosure, numerous specific details are set forth in the following specific embodiments of the present disclosure. It will be appreciated to those skilled in the art that embodiments of the present disclosure can also be implemented without certain specific details. In some embodiments, methods, processes, means, and components that are well known to those skilled in the art are not described in detail, so as to highlight the spirit of the present disclosure.

In the specification, it is to be understood that terms such as "central", "longitudinal", "lateral", "length", "width", "thickness", "upper", "lower", "front", "rear", "left", "right", "inner", "outer", "vertical", "horizontal" and "circumferential" should be construed to refer to the orientation as then described or as shown in the drawings under discussion. These relative terms are only for convenience of description, but do not indicate or imply that the device or element referred to must have a particular orientation, or be constructed or operated in a particular orientation, and thus shall not be construed to limit the present disclosure. In addition, terms such as "first" and "second" are used herein for purposes of description and are not intended to indicate or imply relative importance or significance.

Reference throughout this specification to "an embodiment", "some embodiments", "one embodiment", "another example", "an example", "a specific example", or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example", or "in some examples" in various places throughout this specification are not necessarily referring to the same embodiment or example of the present disclosure. Furthermore, the particular features, structures, materials, or characteristics may be combined in any suitable manner in one or more embodiments or examples.

As illustrated in FIGS. 1 to 11, the present disclosure provides a gummed paper 1, the gummed paper 1 includes a first adhesive layer 11, a first substrate 12, a second adhesive layer 13, a second substrate 14, and a plurality of foaming agent particles. The first adhesive layer 11 is configured to adhere to an object 2. The first substrate 12 is adhered to a surface of the first adhesive layer 11 opposite to the object 2, that is, the first adhesive layer 11 is disposed between the first substrate 12 and the object 2. The second adhesive layer 13 is adhered to a surface of the first substrate 12 opposite to the first adhesive layer 11. The second substrate 14 is adhered to a surface of the second adhesive layer 13 opposite to the first substrate 12, that is, the second adhesive layer 13 is disposed between the first substrate 12 and the second substrate 14. And the plurality of foaming agent particles are distributed in the first adhesive layer 11.

The gummed paper according to embodiments of the present disclosure has a simple structure, guarantees an effective adhesive area, and will not move but stay at an original position when the gummed paper is subjected to heat, thereby preventing the gummed paper from detaching from the object during heating process.

Figure 8:
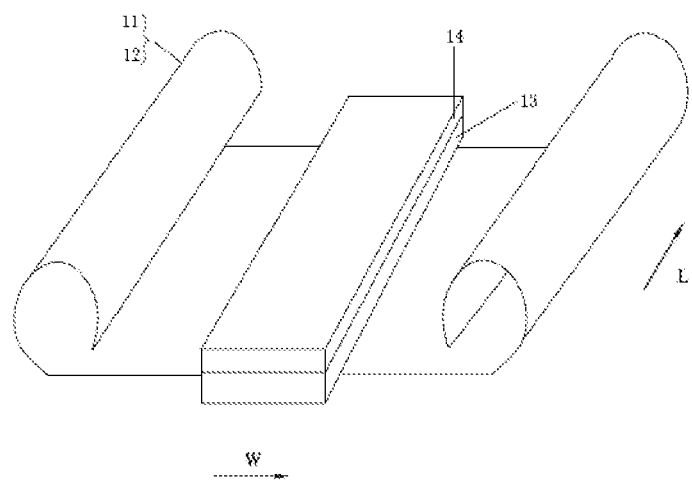
FIG. 8 illustrates a perspective view of the gummed paper according to an embodiment of the present disclosure, where the gummed paper is curled after subjected to heat.

As illustrated in FIG. 8, when the gummed paper 1 is subjected to heat, the plurality of foaming agent particles are foamed, which makes two opposite edges of the first substrate 12 in a width direction W of the gummed paper 1 to curl towards a middle part of the first substrate 12, thereby effectively controlling a curling direction of the gummed paper 1, such that two opposite edges of the first adhesive layer 11 in the width direction W of the gummed paper 1 are peeled off the object 2. However, in some embodiments of the present disclosure, in a length direction L of the gummed paper 1, at least one edge of the second adhesive layer 13 extend beyond the first substrate 12, to form an extension part of the second adhesive layer 13, and the extension part of the second adhesive layer 13 is capable of adhering to the object 2. In the present disclosure, the extension part of the second adhesive layer 13 is capable of adhering to the object 2, such that a middle part of the first adhesive layer 11 remains adhered to but not peeled off the object 2. In some embodiments of the present disclosure, the second adhesive layer 13 generally does not contain the plurality of foaming agent particles therein.

In some embodiments of the present disclosure, the second substrate 14 and the second adhesive layer 13 extend outwards in the length direction L of the gummed paper 1 such that at least one of two ends of the second substrate 14 and at least one of two ends of the second adhesive layer 13 extend beyond an end of the first substrate 12 corresponding to the at least one of the two ends of the second substrate 14 in the length direction L to form the extension part of the second substrate 14 and the extension part of the second adhesive layer 13, and the extension part of the second adhesive layer 13 is capable of adhering to the object 2.

It should be illustrated that, the expression "extension part of the second substrate 14" used herein refers to a part of the second substrate 14 beyond the first substrate 12 at an end of the first substrate 12 in the length direction L; and the expression "extension part of the second adhesive layer 13" used herein refers to a part of the second adhesive layer 13 beyond the first substrate 12 at an end of the first substrate 12 in the length direction L.

Referring to FIGS. 1 to 4 and in combination with FIGS. 5 to 11, before a material layer 3 is coated onto the object 2, the first adhesive layer 11 is adhered to the object 2 to form a reserved region 21, and the extension part of the second adhesive layer 13 is also adhered to the object 2.

The material layer 3 is dried after coated on the object 2. In this case, the gummed paper 1 is subject to heat, the plurality of foaming agent particles are foamed, such that two opposite edges of the first substrate 12 in the width direction W of the gummed paper 1 are curled towards the middle part of the first substrate 12, two edges of the first adhesive layer 11 corresponding to the two curled edges of the first substrate 12 are detached from the object 2 and jack up the material layer 3 at a periphery of the reserved region 21, while the extension part of the second adhesive layer 13 and the middle part of the first adhesive layer 11 remain adhered to the object 2 and are not easily peeled off the object 2. After the gummed paper 1 is dried and peeled off, the reserved region 21 is formed.

Generally, in some embodiments of the present disclosure, a release force between the second adhesive layer 13 and the second substrate 14 is between 2 g/mm and 40 g/mm, such that the second adhesive layer 13 and the second substrate 14 are adhered together and not detached from each other, thereby maintaining the structural integrity.

In some embodiments of the present disclosure, the first adhesive layer 11 may include an acrylate adhesive.

In some embodiments of the present disclosure, the first substrate 12 may include at least one selected from a group of aluminum foil, copper foil, tin foil, nickel foil, silver foil, plastic optical fiber, polyvinyl chloride, polypropylene, polyimide, or a combination thereof.

In some embodiments of the present disclosure, the second adhesive layer 13 may include an acrylate adhesive.

In some embodiments of the present disclosure, the second substrate 14 may include at least one selected from a group of polyester resin, plastic optical fiber, polyvinyl chloride, polypropylene, polyimide, or a combination thereof.

In some embodiments of the present disclosure, the material of the plurality of foaming agent particles may be a physical foaming agent or a chemical foaming agent. The physical foaming agent may be selected from long-chain alkane series foaming agents, including an isopentane foaming agent, an iso-butane foaming agent, etc. The chemical foaming agent may include at least one selected from a group of azodicarbonamide (AC), azodiisobutyronitrile (AIBN), N,N'-dinitroso-pentamethylenetetramine (DPT), 4,4'-oxybisbenzenesulfonic hydrazine (OBSH), p-toluenesulfonyl hydrazine (TSH), etc.

Further, in the first adhesive layer 11, a curing agent may be added. In some embodiments of the present disclosure, the curing agent may be selected from a group of aliphatic polyamines, alicyclic polyamine, low molecular polyamide, modified arylamine, isocyanate, etc.

Figure 5:
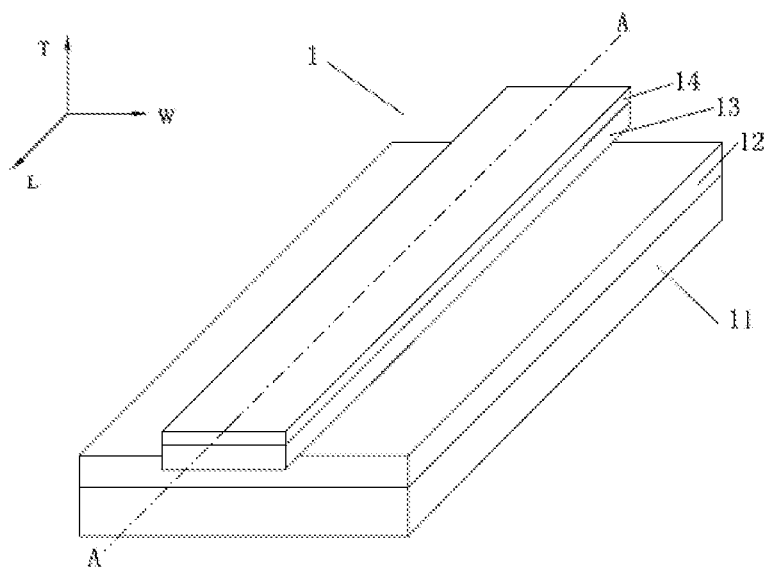
FIG. 5 illustrates a perspective view of the gummed paper according to an embodiment of the present disclosure.
Figure 6:
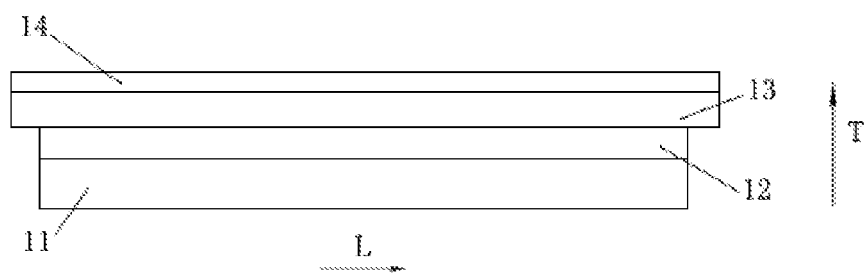
FIG. 6 illustrates a front view of the gummed paper according to an embodiment of the present disclosure.
Figure 7:
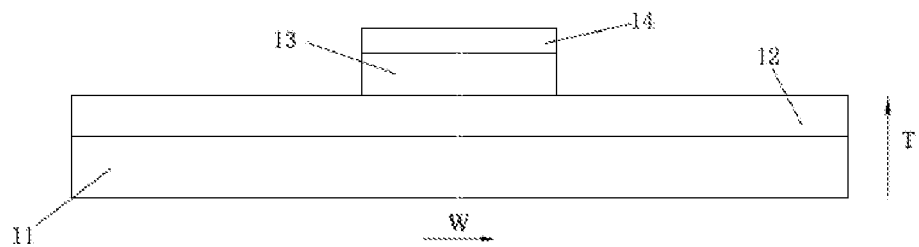
FIG. 7 illustrates a left view of the gummed paper according to an embodiment of the present disclosure.

In some embodiments of the present disclosure, the second substrate 14 and the second adhesive layer 13 extend outwards in the length direction L of the gummed paper 1, such that the two ends of the second substrate 14 and the two ends of the second adhesive layer 13 extend beyond ends of the first substrate 12 corresponding to the two ends of the second substrate 14 in the length direction L of the gummed paper 1 to form an extension part at each of the two ends of the second substrate 14 and an extension part at each of the two ends of the second adhesive layer 13, and each extension part of the second adhesive layer 13 is capable of adhering to the object 2. As illustrated in FIG. 5, both the two ends of the second adhesive layer 13 having the extension parts in the length direction L further maintain the middle part of the first adhesive layer 11 adhered to the object 2 and make it more difficult to peel the first adhesive layer 11 off the object 2.

Specifically, in some embodiments of the present disclosure, a length of the extension part of the gummed paper 1, i.e., a length of the extension part of the second substrate 14 or a length of the extension part of the second adhesive layer 13, is less than 15 mm. In some embodiments a length of the extension part of the gummed paper 1 is between 0.1 mm and 10 mm.

In some embodiments of the present disclosure, in the width direction W of the gummed paper 1, an edge of the second substrate 14 and an edge of the second adhesive layer 13 at a same side are within an edge of the first substrate 12 corresponding to the edge of the second adhesive layer 13, such that a width of the second substrate 14 and a width of the second adhesive layer 13 are both less than a width of the first substrate 12.

In the case where the width of the second substrate 14 and the width of the second adhesive layer 13 are both less than the width of the first substrate 12, the curling of the first substrate 12 and the first adhesive layer 11 is hindered by the edge of the second substrate 14 in the width direction W of the gummed paper 1, so that a curling is stopped and a good curling shape is obtained, which are advantageous for a subsequent mechanical discharge.

In generally, in the width direction W of the gummed paper 1, a difference between the width of the second substrate 14 and the width of the first substrate 12 is less than 15 mm. In some embodiments, the difference between the width of the second substrate 14 and the width of the first substrate 12 is between 0.1 mm and 10 mm. In some embodiments, the width of the second substrate 14 and the width of the second adhesive layer 13 are less than 50 mm. In some embodiments, the width of the second substrate 14 and the width of the second adhesive layer 13 are between 0.1 mm and 40 mm.

In some embodiments of the present disclosure, a projection of a central line A-A of the second substrate 14 in the length direction L of the gummed paper 1 on a surface of the first substrate 12 coincides with a central line of the first substrate 12, such that when the gummed paper 1 is subjected to heat, a cohesive force is concentrated at a middle part of the gummed paper 1 in the length direction L of the gummed paper 1, the curling shape is good, and it is easy to control the curling direction.

In some embodiments of the present disclosure, a width of the first adhesive layer 11 is equal to that of the first substrate 12, and a length of the first adhesive layer 11 is equal to that of the first substrate 12. In some embodiments, the width of the second adhesive layer 13 is equal to that of the second substrate 14, and a length of the second adhesive layer 13 is equal to that of the second substrate 14. Alternatively, in some embodiments, the width of the first adhesive layer 11 is equal to that of the first substrate 12, the length of the first adhesive layer 11 is equal to that of the first substrate 12, the width of the second adhesive layer 13 is equal to that of the second substrate 14, and the length of the second adhesive layer 13 is equal to that of the second substrate 14. In this way, it is convenient for die cutting, and it is easy to prepare the gummed paper 1.

In some embodiments of the present disclosure, the first adhesive layer 11 has a thickness ranging from 10 μm to 40 μm, the first substrate 12 has a thickness ranging from 2 μm to 20 μm, the second adhesive layer 13 has a thickness ranging from 10 µm to 40 µm, and the second substrate 14 has a thickness ranging from 2 µm to 20 µm.

Figure 10:
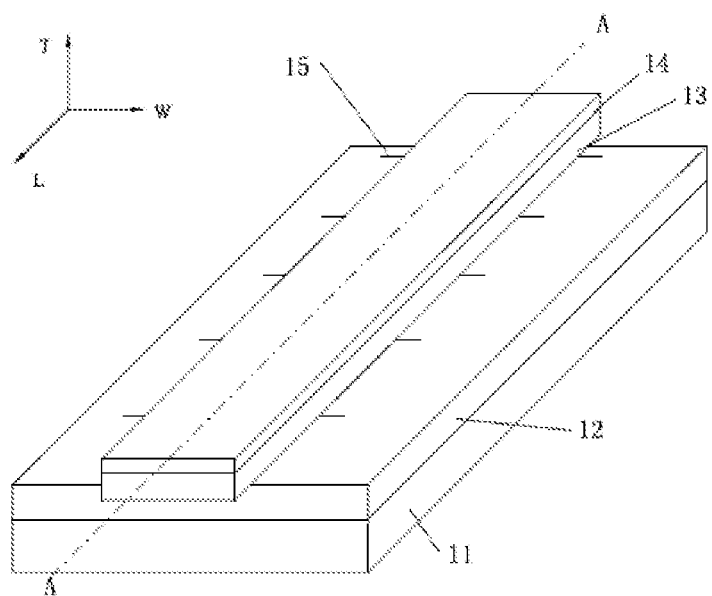
FIG. 10 illustrates a perspective view of the gummed paper according to another embodiment of the present disclosure.

In some embodiments of the present disclosure, as illustrated in FIG. 10, the gummed paper 1 further includes a notch 15 disposed in the width direction W of the gummed paper 1, the notch 15 cuts through the first substrate 12 and cuts into the first adhesive layer 11 in a thickness direction T of the gummed paper 1, and a depth of the notch 15 is less than or equal to a total thickness of the first substrate 12 and the first adhesive layer 11.

Figure 9:
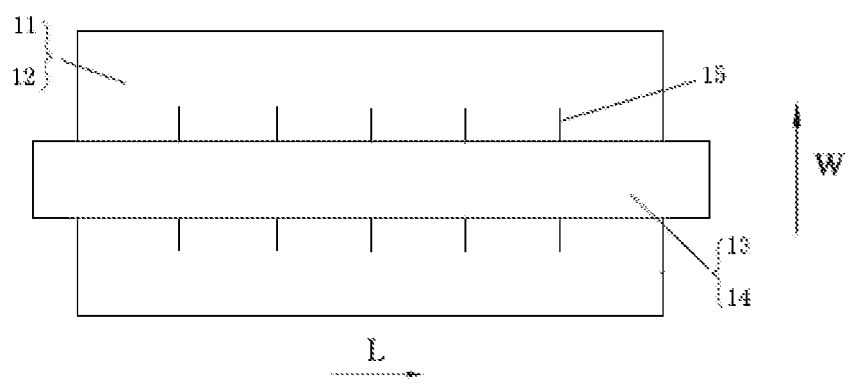
FIG. 9 illustrates a top view of a gummed paper according to another embodiment of the present disclosure.

In the present disclosure, as illustrated in FIG. 9, the notch 15 may be in an S-shape, an L-shape, an I-shape or an X-shape, which will not be specifically limited herein. Further, in some embodiments of the present disclosure, a shortest distance between two end points of the notch 15 in the width direction W is less than a width of the gummed paper 1.

In general, the cohesion force at a position of the notch 15 is small. When the gummed paper 1 is subject to heat, a part of the gummed paper 1 near the notch 15 is curled first to form an obstacle region, which will affect the curling of two opposite edges of the gummed paper 1 in the width direction W, thereby controlling the curling direction and the curling degree.

Figure 11:
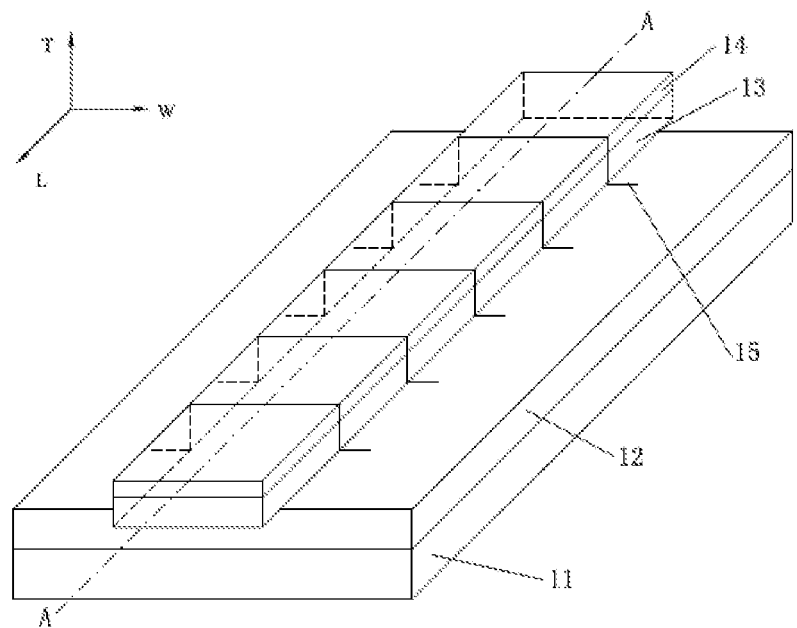
FIG. 11 illustrates a perspective view of a gummed paper according to another embodiment of the present disclosure.

In some embodiments of the present disclosure, as illustrated in FIG. 11, the notch 15 is disposed in the width direction W of the gummed paper 1, the notch 15 cuts through the second substrate 14 and cuts into the second adhesive layer 13, the first substrate 12 and the first adhesive layer 11 in the thickness direction T of the gummed paper 1. And the depth of the notch 15 is less than or equal to a total thickness of the second substrate 14, the second adhesive layer 13, the first substrate 12 and the first adhesive layer 11. Also, in some embodiments of the present disclosure, the shortest distance between the two end points of the notch 15 in the width direction W of the gummed paper 1 is less than the width of the gummed paper 1.

According to the present disclosure, the extension part of the second adhesive layer 13 is adhered to the object 2, and the middle part of the gummed paper 1 remains adhered to but not peeled off the object 2, thereby ensuring an effective adhesive area, and preventing the material layer 3 from detaching from the object 2 during the drying process of the gummed paper 1.

According to the present disclosure, when the gummed paper 1 is subjected to heat, the plurality of foaming agent particles are foamed, such that the two opposite edges of the gummed paper 1 in the width direction W of the gummed paper 1 are curled towards the middle part of the gummed paper 1, thereby effectively controlling the curling direction of the gummed paper 1, and preventing the damage of the appearance of the material layer 3. Moreover, the directional curling of the gummed paper 1 may reduce the occurrence of warpage at the edge where the peeling occurs, thereby effectively reducing the belt-broken possibility in a subsequent rolling process.

The gummed paper 1 according to the present disclosure may be prepared by the method as follows:

Step 1: coating a mixture of an acrylate compound, a plurality of foaming agent particles and a curing agent onto a release film to obtain a first material roll I having a first adhesive layer 11;

Step 2: adhering a surface of the first material roll I opposite to the release film with a first substrate 12 under a compound pressure to obtain a second material roll II;

Step 3: cutting the first substrate 12 in a width direction W thereof, and cutting, in a thickness direction T, through the first substrate 12 and into the first adhesive layer 11;

Step 4: coating an acrylate adhesive onto a second substrate 14 to obtain a third material roll III having a second adhesive layer 13; and Step 5: adhering a surface of the first substrate 12 of the second material roll II with a surface of the second adhesive layer 13 of the third material roll III under a compound pressure, followed by cross-cutting and aging treatment to obtain the gummed paper 1.

In addition, in some embodiments of the present disclosure, after the gummed paper 1 is preliminarily prepared, it is feasible to cut the second substrate 14 in the width direction W thereof and to cut, in the thickness direction T of the gummed paper 1, through the second substrate 14 and into the second adhesive layer 13, the first substrate 12 and the first adhesive layer 11.

Although explanatory embodiments have been shown and described above, it would be appreciated by those skilled in the art that the above embodiments cannot be construed to limit the present disclosure, and changes, alternatives, and modifications can be made in the embodiments without departing from spirit, principles and scope of the present disclosure. Therefore, the protection scope of the present disclosure shall be based on the protection scope of the appended claims.

What is claimed is:

1. A multilayer adhesive article, comprising:
a first adhesive layer, configured to adhere to an object;
a first substrate, the first adhesive layer disposed between the first substrate and the object, wherein the first substrate has a length direction and a width direction that is perpendicular to the length direction;
a second adhesive layer, adhered to a surface of the first substrate opposite to the first adhesive layer;
a second substrate, the second adhesive layer disposed between the first substrate and the second substrate, wherein the second substrate is disposed along a middle part of the multilayer adhesive article in the width direction of the first substrate and has a shorter width than that of the first substrate; and
a plurality of foaming agent particles, distributed in the first adhesive layer, wherein the plurality of foaming agent particles, when subject to heat, are configured to be foamed and cause the first substrate to be detached from the object by curling two opposite edges of the first substrate towards the middle part of the multilayer adhesive article along the width direction of the first substrate,
wherein in a length direction of the multilayer adhesive article, at least one edge of the second adhesive layer extends beyond the first substrate, to form an extension part of the second adhesive layer, and the extension part of the second adhesive layer is capable of adhering to the object.

2. The multilayer adhesive article according to claim 1, wherein the second substrate and the second adhesive layer extend outwards in a length direction of the multilayer adhesive article, such that at least one of two ends of the second substrate and at least one of two ends of the second adhesive layer extend beyond an end of the first substrate corresponding to the at least one of the two ends of the second substrate in the length direction to form an extension part of the second substrate and the extension part of the second adhesive layer.

3. The multilayer adhesive article according to claim 2, wherein the second substrate and the second adhesive layer extend outwards in the length direction of the multilayer adhesive article, such that the two ends of the second substrate and the two ends of the second adhesive layer extend beyond ends of the first substrate corresponding to the two ends of the second substrate in the length direction.

4. The multilayer adhesive article according to claim 2, wherein a length of the extension part of the second substrate and a length of the extension part of the second adhesive layer are both greater than a total thickness of the first substrate and the first adhesive layer.

5. The multilayer adhesive article according to claim 1, wherein in a width direction of the multilayer adhesive article, an edge of the second substrate and an edge of the second adhesive layer at a same side are within an edge of the first substrate corresponding to the edge of the second adhesive layer, such that a width of the second substrate and a width of the second adhesive layer are both less than a width of the first substrate.

6. The multilayer adhesive article according to claim 5, wherein in the width direction of the multilayer adhesive article, a difference between the width of the second substrate and the width of the first substrate is less than 15 mm.

7. The multilayer adhesive article according to claim 1, wherein a projection of a central line of the second substrate in a length direction of the multilayer adhesive article on a surface of the first substrate coincides with a central line of the first substrate.

8. The multilayer adhesive article according to claim 1, wherein
  a width of the first adhesive layer is equal to that of the first substrate, and a length of the first adhesive layer is equal to that of the first substrate; or
  a width of the second adhesive layer is equal to that of the second substrate, and a length of the second adhesive layer is equal to that of the second substrate; or
  the width of the first adhesive layer is equal to that of the first substrate, the length of the first adhesive layer is equal to that of the first substrate, and the width of the second adhesive layer is equal to that of the second substrate, the length of the second adhesive layer is equal to that of the second substrate.

9. The multilayer adhesive article according to claim 1, further comprising a notch disposed in a width direction of the multilayer adhesive article, wherein the notch cuts through the first substrate and cuts into the first adhesive layer in a thickness direction of the multilayer adhesive article.

10. The multilayer adhesive article according to claim 1, further comprising a notch disposed in the width direction of the multilayer adhesive article, wherein the notch cuts through the second substrate and the second adhesive layer in the thickness direction of the multilayer adhesive article.

11. The multilayer adhesive article according to claim 9, wherein a shortest distance between two end points of the notch in the width direction is less than a width of the multilayer adhesive article.

12. The multilayer adhesive article according to claim 1, wherein a release force between the second adhesive layer and the second substrate is between 2 g/mm and 40 g/mm.

13. The multilayer adhesive article according to claim 1, wherein the first adhesive layer has a thickness in the range of from 10 µm to 40 µm, the first substrate has a thickness in the range of from 2 µm to 20 µm, the second adhesive layer has a thickness in the range of from 10 µm to 40 µm, and the second substrate has a thickness in the range of from 2 µm to 20 µm.

14. The multilayer adhesive article according to claim 2, wherein the length of the extension part of the second substrate or the length of the extension part of the second adhesive layer is less than 15 mm.

15. The multilayer adhesive article according to claim 5, wherein the width of the second substrate and the width of the second adhesive layer are less than 50 mm.

16. The multilayer adhesive article according to claim 1, wherein the first adhesive layer comprises an acrylate adhesive, and the second adhesive layer comprises an acrylate adhesive.

17. The multilayer adhesive article according to claim 1, wherein the first substrate comprises at least one selected from a group of aluminum foil, copper foil, tin foil, nickel foil, silver foil, plastic optical fiber, polyvinyl chloride, polypropylene, polyimide, or a combination thereof.

18. The multilayer adhesive article according to claim 1, wherein the second substrate comprises at least one selected from a group of polyester resin, plastic optical fiber, polyvinyl chloride, polypropylene, polyimide, or a combination thereof.

* * * * *